Patented Feb. 24, 1948

2,436,596

UNITED STATES PATENT OFFICE 2,436,596

ADHESIVE AND METHOD OF MAKING THE SAME

Henry Francis Noakes and James Robert Martyn, James Island, British Columbia, Canada, assignors to E. I. du Pont de Nemours & Company, Wilmington, Del., a corporation of Delaware No Drawing. Application August 22, 1942, Serial No. 455,778

4 Claims. (Cl. 154—141)

This invention relates to adhesives of the kind used for joining together wood, cardboard or paper in various articles of manufacture, and more particularly to adhesives for use with said materials treated with a waxy or greasy substance.

In the packaging of merchandise which deteriorates by the absorption, or by the loss of moisture, it is common to use cardboard cartons impregnated or coated with paraffin wax or a grease and in some methods of packaging the filled cartons are packed in a box lined with a waxed or greased paper. Alternately the cartons may be dispensed with, and the merchandise placed directly in the liner. The cartons and liners are sealed by an adhesive in order to make a tight and permanent joint.

Many other conditions exist in which materials moistureproofed by a wax or grease must be joined together, and it is always of vital importance that the adhesives prevent the joint from being pulled apart. The glues and gums heretofore in use do not satisfactorily adhere to a waxed surface.

It is an object of the present invention to provide an adhesive and process of making the same which will join waxy and greasy surfaces together firmly.

Another object of the invention is to provide a moistureproof package comprising a wax or grease coated or impregnated wrapper the overlapping portions of which are securely sealed by an interposed adhesive.

Other objects will appear as the description proceeds.

The objects of the invention are accomplished by preparing adhesives comprising an emulsion of glue in a volatile solvent for wax and grease.

The glues we have found satisfactory for the purposes of our invention include the gelatinous glue made from bones and hides of animals, fish glue and casein glue. These may be referred to as protein glues. The solvents are those which are capable of dissolving the solid wax or grease on the surface of the wrapping material and of forming an emulsion with the glue composition. They should volatilize easily. Examples of such solvents are carbon tetrachloride, trichlorethylene, chloroform, ether, carbon disulphide, xylol and benzene. In some cases such as carbon disulphide and ether, mixtures of the solvents can be satisfactorily employed. To give the best results the solvents should be substantially free from moisture.

In one of our methods of preparing adhesives according to our invention we heat solid glue of the kind made from animal bones and hides, with sufficient water to form a liquid glue. The water as added to the solid glue is cold; hot water should not be used as it tends to form lumps which are difficult to disperse. After heating, the glue is allowed to cool and when it has reached a temperature of about 44° C. the solvent is added slowly and the mixture is vigorously stirred until a creamy emulsion is obtained. The quantity of solvent used and the temperature of the liquid to which it is added vary with the type of solvent. Our preferred solvent is carbon tetrachloride and we use about 300 to 600 parts by weight to 100 parts by weight of the glue, and the temperature of the glue is about 43° C. when the solvent is added. The emulsion solidifies at about 21° C.

We may partially hydrolyze the glue by the use of hydrolyzing agents, as for example, acids or hydroxides of the alkali metals, obtaining in this manner glues which solidify at lower temperatures. In our preferred method of preparing this class of adhesives we prepare the liquid glue in the manner already explained. The glue is allowed to cool and when the temperature has fallen to about 30° C. we add sulphuric acid in the ratio of about 20 to 25 lbs. of 70% strength acid to 100 lbs. of glue. The acidified glue is allowed to stand for about 2½ hours. If it is desired to shorten the time of hydrolysis we use up to about 44 parts of the acid to 100 parts of glue and obtain the proper degree of hydrolysis in about one hour. After the glue is hydrolyzed we neutralize the excess acid by the addition of powdered limestone and then emulsify by adding the solvent and stirring. If an alkali has been used for the hydrolysis of the glue we neutralize the excess by adding acetic or hydrochloric acid.

Our invention also includes adhesives made with casein. When preparing this class of glue, we obtain solution and partial hydrolysis of the casein by heating it with a solution of borax in water and completing the preparation by adding the solvent with stirring.

For dissolving the casein, any salt of a strong base and a weak acid is satisfactory as well as borax. Sodium carbonate was used in our test to investigate this point.

Urea and amines generally are effective dissolving agents for casein, and in fact from our experience with the glues, gave a superior product to those in which borax or sodium carbonate were used. The latter are very thick and difficult to spread on wax paper even though the proportion of carbon tetrachloride in the emulsion is greatly increased. The following amines are examples of those found to be satisfactory: urea, triethanolamine, propylaminediamine, diethanolamine, diethylene-triamine, morpholine-diethyleneimide oxide and diethylaminoethanol.

Our invention is illustrated but not limited by the following examples:

EXAMPLE I 3600 parts by weight of glue of the kind made from animal bones and hides, were broken into moderately small pieces and added to 8000 parts by weight of cold water in a metal container, and allowed to stand for 36 hours. At the end of this time the glue had softened and the container was then placed on a steam bath. After the glue had completely dissolved in the water the container was removed from the heat source and the contents allowed to cool to about 44° C., the glue remaining liquid at this temperature. 12,800 parts by weight of carbon tetrachloride were then added slowly with stirring. A creamy emulsion was obtained which was stable at room temperature.

Pieces of heavily waxed paper were joined by this adhesive which dried readily to a firm bond.

EXAMPLE II 2265 parts by weight of glue of the kind made from animal bones and hides were broken into moderately small pieces and added to 5500 parts by weight of cold water. The mixture was allowed to stand for 36 hours by which time the glue had become soft and pliable. The container was then placed on a steam bath and the contents were heated until the glue was completely dissolved in the water, when the container was removed from the bath and the temperature allowed to fall to 40° C. Five hundred parts by weight of sulphuric acid of 70% strength were added and the mixture allowed to stand for 2½ hours. At the end of that time the excess acid was neutralized by the addition of powdered limestone. A small quantity of a light hydrocarbon oil was added to decrease the foaming which took place during neutralization. The mixture was again warmed to 43° C. and 12,800 parts by weight of carbon tetrachloride was added slowly during stirring. An emulsion was obtained with good adhesive properties.

EXAMPLE III 2265 parts by weight of glue of the kind made from animal bones and hides were broken into moderately small pieces and added to 5500 parts by weight of cold water in a metal container. The glue was allowed to stand in the water for 36 hours when it become soft and pliable. The container was then placed in a steam bath and the contents were heated until the glue was completely dissolved in the water, when the container was removed from the bath and the temperature of the glue was allowed to fall to 40° C. One thousand parts by weight of sulphuric acid of 70% strength were added and the mixture allowed to stand for one hour. At the end of this time the excess acid was neutralized by the addition of powdered limestone and a small quantity of a light hydrocarbon oil was added to decrease the foaming which took place during neutralization. The mixture was again warmed to 43° C. and 12,800 parts by weight of carbon tetrachloride were added slowly during stirring. An emulsion was obtained with good adhesive properties.

Examples II and III represent embodiments of the invention in which the glue has a low thermal setting point. In these examples the proteins were at least partially hydrolyzed to proteoses. In Example III the conditions of the hydrolysis represent the practical maximum and it is normally preferred not to hydrolize the glue to obtain a lower setting point since some loss in adhesive power results. The $CaSO_4$ formed by neutralizing the excess acid may be removed if desired, but its presence is not objectionable for most purposes.

EXAMPLE IV

Fifty parts by weight of borax $(Na_2B_4O_7:10H_2O)$ in 200 parts by weight of water were added to fifty parts by weight of dry fat-free powdered casein. The mixture was heated to 43° C. and allowed to stand for three hours when complete solution had taken place. While the mixture had a temperature of 43° C. 160 parts by weight of moisture-free carbon tetrachloride were added and at the same time the mixture was vigorously agitated. A thick creamy emulsion was obtained.

This adhesive dried in three to four hours and forms a satisfactory bond between sheets of waxed paper.

The adhesives of this invention solidify at about 15° to 21° C., they can easily be liquefied by warming and will give the best results if applied at temperatures of about 27° to 38° C. A few drops of phenol added to any of these adhesives will prevent bacterial action.

Comparative efficiencies of the adhesives were estimated by a method of coating a 4" x 4" piece of kraft wrapping paper with the adhesive to be tested, and superimposing another 4" square of the same paper, pressure of a 1 pound weight was applied and maintained until the adhesive was dry.

The portions of the joint where adhesion had taken place were measured and calculated to a percentage of the whole area. For example, the adhesion of two pieces of the unwaxed paper pasted with casein glue was complete, and taken as 100%.

TABLE

| | Casein Glue | Casein Glue Emulsified with $CCl_4$ | Gelatinic Glue | Gelatinic Glue Emulsified with $CCl_4$ | Hydrolyzed and Neutralized Gelatinic glue | Hydrolyzed and Neutralized Gelatinic glue Emulsified with $CCl_4$ | Acid Gelatinic Glue | Acid Gelatinic Glue Emulsified with $CCl_4$ |
|---|---|---|---|---|---|---|---|---|
| Unwaxed Surface | Percent 100 | Percent 90 | Percent 95 | Percent 90 | Percent 80 | Percent 70 | Percent 50 | Percent 40 |
| Waxed Surface | 0 | 90 | 0 | 95 | 0 | 70 | 0 | 30 |

For emulsions of "gelatinic" glues the range of useful ratios run from 40 parts of glue "solution" with 60 parts of carbon tetrachloride, to 80 parts glue "solution" with 20 parts carbon tetrachloride. The preferred range is 55–65 parts of glue "solution" to 35–45 parts of carbon tetrachloride. The amount of water used to dissolve the glue is not of any great importance.

The emulsions do not require a stabilizing agent to keep them from separating. There is a slight separation in the case of the gelatinic glue emulsions but on warming up for use they become uniformly emulsified again on stirring.

It is apparent that many widely different embodiments of this invention may be made without departing from the spirit and scope thereof, and therefore, it is not intended to be limited except as indicated in the appended claims.

We claim:

1. A laminated fabric comprising a paper having a grease or wax on the surface and firmly joined thereto a similar sheet of paper by means of an intermediate film of a non-acid adhesive comprising an emulsion of an animal glue and a water immiscible volatile solvent for the said wax or grease, said solvent being present in amount greater than the dry glue.

2. The article of claim 1 in which the adhesive contains carbon tetrachloride as the said solvent.

3. The article of claim 1 in which the protein glue is partially hydrolyzed.

4. The process of joining a plurality of paper sheets at least one layer of which has a grease or wax coating on the surface to be joined which comprises applying thereto a non-acid emulsion containing from 40 to 80 parts of a water solution of a protein glue and 60 to 20 parts of water immiscible solvent for the said oil or grease and thereafter applying a second sheet of paper in contact with the said emulsion.

HENRY FRANCIS NOAKES.
JAMES ROBERT MARTYN.

REFERENCES CITED

The following references are of record in the file of this patent:

UNITED STATES PATENTS

| Number | Name | Date |
|---|---|---|
| 2,108,805 | Finzel et al. | Feb. 22, 1938 |
| 1,962,660 | Keller | June 12, 1934 |
| 1,815,365 | Snyder | July 21, 1931 |
| 1,814,768 | Rippey | July 14, 1931 |
| 1,726,510 | Cone et al. | Aug. 27, 1929 |
| 1,965,778 | Marvin | July 10, 1934 |
| 2,310,795 | La Piana | Feb. 9, 1943 |

OTHER REFERENCES

Chemical Abstracts 38, No. 10, May 20, 1944, p. 2421 #7 (abstract of German Patent 717,503 to Kukula, Jan. 29, 1942).